(12) United States Patent
Blum et al.

(10) Patent No.: US 8,300,275 B2
(45) Date of Patent: Oct. 30, 2012

(54) METHOD FOR REDUCING THE AREA COVERAGE OF A PRINTING PLATE

(75) Inventors: Dietrich Blum, Kiel (DE); Andreas Gembe, Leimen-Gauangelloch (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 808 days.

(21) Appl. No.: 12/428,163

(22) Filed: Apr. 22, 2009

(65) Prior Publication Data

US 2009/0262179 A1 Oct. 22, 2009

(30) Foreign Application Priority Data

Apr. 22, 2008 (DE) .......................... 10 2008 020 214
Aug. 8, 2008 (DE) .......................... 10 2008 037 087

(51) Int. Cl.
*H04N 1/405* (2006.01)

(52) U.S. Cl. ...... 358/3.3; 358/3.06; 358/3.29; 358/3.13; 358/3.19; 358/3.2; 358/1.9; 358/536; 358/534; 101/492

(58) Field of Classification Search .......................... None
See application file for complete search history.

(56) References Cited

U.S. PATENT DOCUMENTS

| | | | |
|---|---|---|---|
| 5,155,599 A * | 10/1992 | Delabastita | 358/3.07 |
| 5,563,985 A | 10/1996 | Klassen et al. | |
| 6,060,208 A | 5/2000 | Wang | |
| 6,406,833 B1 | 6/2002 | Nouel | |
| 6,492,095 B2 | 12/2002 | Samworth | |
| 6,532,082 B1 * | 3/2003 | Dewitte | 358/3.3 |
| 6,701,847 B2 | 3/2004 | Weichmann | |
| 6,717,601 B2 * | 4/2004 | Sanger | 347/115 |
| 6,938,550 B2 * | 9/2005 | Frisch | 101/484 |
| 2007/0008585 A1 * | 1/2007 | Karito | 358/3.06 |
| 2007/0047001 A1 | 3/2007 | Blaus et al. | |

FOREIGN PATENT DOCUMENTS

| | | |
|---|---|---|
| DE | 19953145 A1 | 5/2000 |
| EP | 0770228 B1 | 5/1997 |
| EP | 1251011 B1 | 6/2006 |
| WO | 0069650 A1 | 11/2000 |

OTHER PUBLICATIONS

German Search Report dated Jun. 4, 2009.
German Search Report dated Feb. 12, 2009.

* cited by examiner

*Primary Examiner* — Benny Q Tieu
*Assistant Examiner* — Paul F Payer
(74) *Attorney, Agent, or Firm* — Laurence A. Greenberg; Werner H. Stemer; Ralph E. Locher

(57) ABSTRACT

Before image data are screened for the subsequent exposure of a printing form, files needed for the screening step are changed in such a way that the values of individual elements in the data fields are changed. The number of elements whose values are changed is determined by evaluating contiguous regions within the data fields. These can be, for example, threshold value matrices in which individual matrix elements are set to a value corresponding to the color white, or which, for the half-tones, are calibrated to a reduced value of the full-tone density. In the latter case, the full-tone image points are screened with a frequency-modulated screen.

9 Claims, 11 Drawing Sheets

METHOD FOR REDUCING THE AREA COVERAGE OF A PRINTING PLATE

CROSS-REFERENCE TO RELATED APPLICATION

This application claims the priority benefit, under 35 U.S.C. §119, to German patent applications DE 10 2008 020 214, filed Apr. 22, 2008, and DE 10 2008 037 087, filed Aug. 8, 2008.

BACKGROUND OF THE INVENTION

Field of the Invention

The invention lies in the field of printing technology. In offset printing presses, two types of inking units that are different in principle are currently used. In particular in sheet-fed offset, so-called zonal inking units, which have a large number of individually adjustable zone screws over the sheet width, are widespread. Using these, in accordance with the subject to be printed, the amount of ink conveyed by the rolls of the inking unit and offered to the printing plate can be adjusted differently in the associated zonal regions. Inking units of the second type are so-called "anilox" inking units, frequently also designated short form inking units. These have an engraved roll with a fixed filling of cells, which is rotated in contact with an ink reservoir and is doctored off by a doctor over the entire width. This inking unit makes a uniform amount of ink available to the printing plate over the entire width, which amount can also be influenced only to a very small extent, for example via the viscosity of the ink by controlling the temperature. Relatively large changes in the ink requirement necessitate a relatively complicated replacement of the complete engraved roll for one with a different filling of cells.

Anilox inking units are more widespread in web fed offset, in particular in newspaper presses. In addition, however, sheetfed offset presses with anilox inking units have also recently become known.

The sheet to be printed requires different amounts of ink, depending on the paper used, the ink used, etc., in order to achieve a defined area coverage or full-tone density. Since the ink offered in anilox inking units, as stated above, can be changed only within a very narrow range via the viscosity, and attempts are made to avoid the complicated replacement of engraved rolls, it has already been proposed to change the amount of ink to be transferred to the printed sheet via a modification to the screened printed image. The prior art proposals are aimed at reducing the area coverage of the screened printed image specifically. To this end, European patent EP 0 770 228 B1 proposes superimposing a stochastic pattern of white dots on the printed image or placing a corresponding pattern of black dots on the film to be copied to the printing form. European patent EP 1 251 011 B1 describes a method in which a fine pattern of holes is exposed into the already screened image or into the area elements of the binary image information which controls the plate exposer, it being possible for said pattern of holes to be placed stochastically, just as in the afore-mentioned European patent EP 0 770 228 B1. A quite similar method is also described in German published patent application DE 199 53 145 A1 for a laser proofer.

During the printing operation, ink runs out of the neighboring pixels into the holes or white dots of the finer pattern, so that they are no longer visible. As a result, the ink layer thickness of the printed image overall is reduced by the ratio of the white dots to the pixels occupied by ink, therefore in the desired manner.

This prior art method intervenes in the already screened printed image during or following the screening of the printed image. Viewed superficially, this has the advantage that the already screened datasets for the exposure of the printing plates do not have to be screened once in the prepress stage and a second time when the same printed image is intended to be printed once more with a printing plate with reduced area coverage. However, this case does not occur frequently in practice. This is because, under constant production conditions on, for example, always the same press with an anilox inking unit, the process of area reduction will always be the same, so that an additional process for producing a second plate with reduced area coverage is disadvantageous. However, the simple superimposition of the screened image with pattern of white dots has yet further disadvantages. They are to be seen, amongst other things, in the fact that, in the case of relatively large reductions in the surface density, the printed dots become unsharp and the tonal value characteristics are disrupted by increased dot growth. Likewise disadvantageous in both methods according to the prior art is that the image content is taken into account only inadequately during the reduction in the area coverage. The uniform superimposition of the printed image with a pattern of white dots additionally produces visually perceptible instability in the printed image over the complete tonal value range.

BRIEF SUMMARY OF THE INVENTION

It is accordingly an object of the invention to provide a method of reducing the area coverage of a printing place which overcomes the above-mentioned disadvantages of the heretofore-known devices and methods of this general type and which allows the area coverage of the image to be printed to be changed in a manner which, as compared with the prior art and in relation to the printing plate produced as a result, has a high quality.

With the foregoing and other objects in view there is provided, in accordance with the invention, a method of producing printing plates with reduced area coverage. In a first embodiment of the invention, the method comprises:

prior to screening image data for a subsequent exposure of the printing forms, providing one or more data files with data needed for the screening step and changing the data such that values of individual elements in two-dimensional data fields are changed, and thereby determining a number of elements whose values are changed by evaluating regions within the data fields.

In accordance with an alternative embodiment, the method comprises, again prior to screening the image data for a subsequent exposure of the printing forms, producing half-tone image datasets built up from pixels which, as compared with a size of the pixels of the image screened in one of the following steps, have a comparable pixel size; and erasing a number of pixels within the image datasets in accordance with a desired reduction in a tonal value, by setting a value thereof to a value corresponding to an uncovered area.

In accordance with a further embodiment, there is provided, in accordance with the invention, a method of producing printing plates with reduced area coverage, which comprises: modifying a threshold value matrix or threshold value matrices needed for screening the image data for a subsequent exposure of the printing forms such that, in accordance with a desired reduction in the area coverage, individual elements within the threshold value matrix are changed and set to a value corresponding to color white in the print.

In accordance with a further alternative embodiment, the method comprises: prior to screening image data for a subsequent exposure of the printing forms, changing the data in one or more files needed for the screening step such that full-tone image points are screened with a frequency-modulated screen, an amount of pixels remaining white in the half-tone cells (r) leading to a desired reduction in the full-tone density; and calibrating the threshold value matrix for screening the half-tones to a reduced value of the full-tone density.

The invention also encompasses the actual production of printing plates with reduced area coverage wherein the data have been changed in accordance with one of the above methods. Further, the invention encompasses a printing plate produced by the above summarized methods and also a printing press fitted with printing plates produced accordingly.

In other words, according to the invention, in order to reduce the surface density, action is taken on the data which is present before the actual process of screening the printed image or is first needed for the screening process. This can be, for example, the half-tone image data to be screened later or else the threshold value matrix which is needed as a tool for screening the image data in accordance with predefined screening method. In the first case, the procedure is expediently such that, firstly a half-tone representation of the sheet is produced at the resolution at which pixels are subsequently produced during the screening. After that, this data, which represents the sheet, is subdivided into micro-areas and in each micro-area a value is calculated which is a measure of how many pixels in the micro-area are to be erased. In this way, a "perforated" half-tone image is produced which, after passing through the subsequent screening, contains the desired reduction in the tonal values, the "holes" placed in the original image being based on the image content and being placed only where there is also actually image content and not, as in the prior art, over the entire area of the sheet in accordance with a predefined pattern. Instead of initiating the half-tone presentation in micro-areas, it is also possible to have a two-dimensional filter run over the half-tone data, for example a convolution filter, which adds up the desired tonal values of the neighboring pixels. In this case, the respective area of the image in which the pixels contributing to the total value are located takes on the function of the aforementioned micro-areas.

In the second case, i.e. in the case of the manipulation of the threshold value matrix, in order to reduce the tonal values, individual elements of the threshold value matrix are set to the numerical value which represents white. The number of dots to be set to white is calculated from the magnitude of the "mountain range" represented by the numerical values in the threshold value matrix, and the desired area reduction. In this case, by considering the proximity of the elements in the matrix, it is ensured that no "heaps" of white dots arise, which means that points in the threshold value mountain range that are set to the value for white do not adjoin one another in an undesired manner. In this way, the printing dots produced in the subsequent screening substantially maintain their shape and size and are only more or less highly perforated.

It is expedient to linearize the "perforated threshold value mountain range," i.e. the matrix with the modified data, by means of a suitable sorting algorithm before calibration data which, for example, describe the extent of tonal value gain during printing, is incorporated into the threshold value matrix by calculation. Advantageously, instead of individual pixels, groups of pixels, for example in each case four adjoining one another, can be set to white; this variant is expedient in particular when the printing dots are built up from a very fine pixel pattern and at the same time relatively large reductions in the area coverage are desired.

During the manipulation of the threshold value matrix or matrices, the procedure can also be such that substantially only the full-tone areas, that is to say for example the parts of the image having a tonal value range from 99% to 100%, are perforated with a stochastic structure of white dots and their tonal value is therefore reduced. The tonal values lying below this (0% to 99%) are not perforated by the stochastic white dot structure but remain unaffected thereby. Only tonal value adaptation is performed on them, in that they are recalibrated or re-linearized with known software tools in order to avoid a density step, so that the range of area coverage with the screen selected for the print job for the tonal values from 0 to 99% corresponds to a range of area coverage between 0% and the value to which the full-tone density is intended to be reduced or adjoins this reduced value.

The reduction in the full-tone areas by means of superimposing the white dots can expediently be carried out simply by the full-tone areas being screened with frequency modulation, while for the tonal values below the full-tone, for example an amplitude-modulated screen is used.

The advantage of this method variant resides firstly in the fact that the working tools customarily present at the prepress stage, such as calibration/linearization software, frequency-modulated and amplitude-modulated screens, etc., can be used. The screen for the white dot structure can be selected as desired and does not have a detrimental effect on the screening of the tonal values from 0 to 99%. The entire working sequence can easily be comprehended by the personnel entrusted with it and the result is visible and measurable. In addition, the screen remains undisturbed in the tonal value ranges below the full-tone, so that no instability arises in the print of the screened image.

The common factor in all three variants is that the data modified in this way can be used without restriction in all known screening methods, and that virtually no performance loss occurs as compared with screening the "untreated" data.

In addition, according to the invention, the screening of the print job and reduction of the area coverage can advantageously be carried out in one process.

Other features which are considered as characteristic for the invention are set forth in the appended claims.

Although the invention is illustrated and described herein as embodied in a method of reducing the area coverage on a printing plate, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

DETAILED DESCRIPTION OF THE INVENTION

Figure 1:
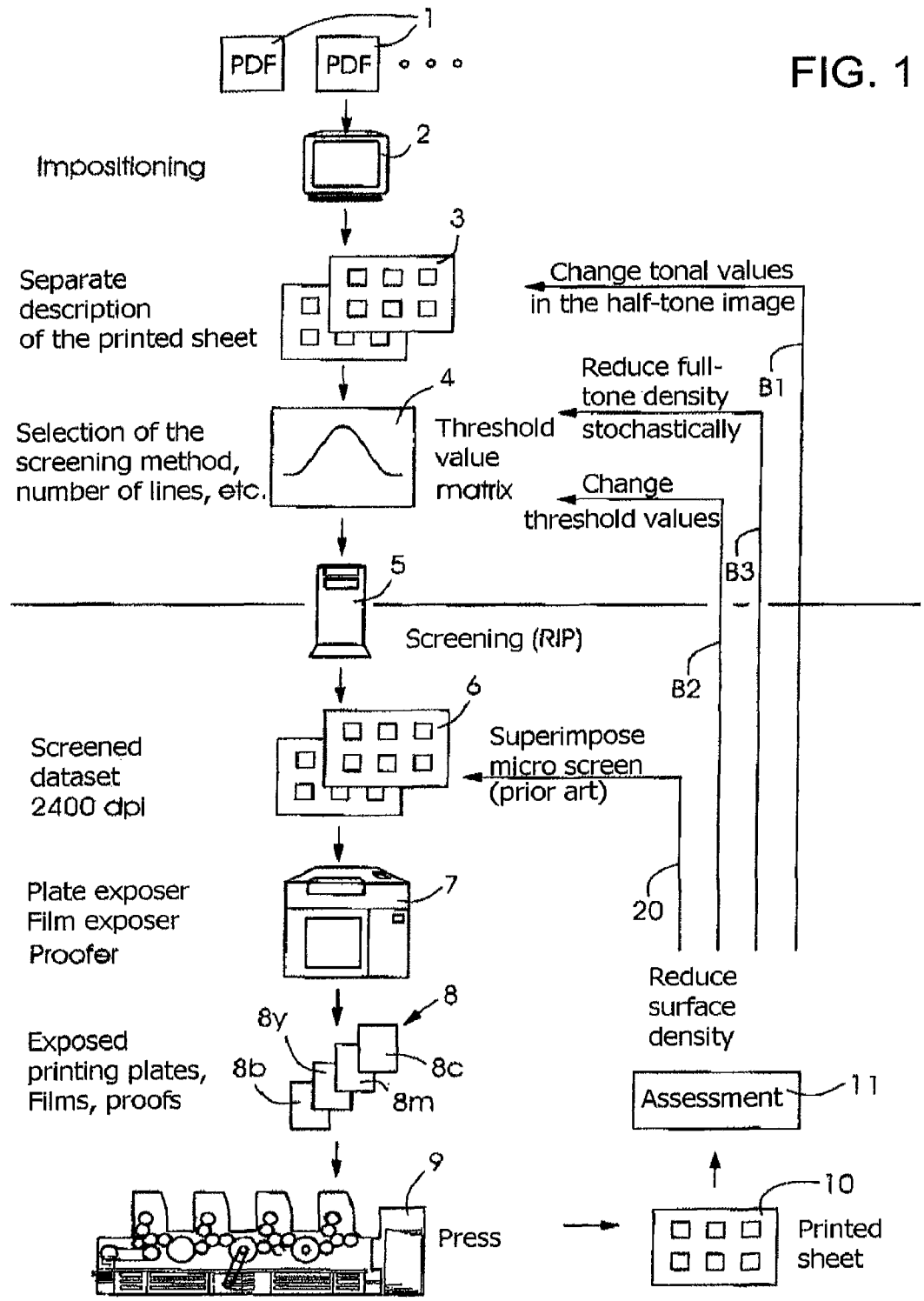
FIG. 1 is a flow chart which reproduces the method according to the invention for producing modified printing originals.

Referring now to the figures of the drawing in detail and first, particularly, to FIG. 1 thereof, there is illustrated in the form of a flow chart the chronological sequence of individual steps in the prepress stage, to the extent required for the understanding of the invention. The illustration begins here with the optional step in which the pages 1 of the product to be printed, present for example in the PDF format following setting, are imposed. In this step, designated "impositioning" in the figure, a plurality of pages are put together to form a printed sheet. There then follows, in the context of a data-processing process that is usual in the prepress stage, a transformation of the input data into a standardized printing color space. In the process, for the four printing colors, for example, separate descriptions 3 of the printed sheet are produced, on which the pages 1 are arranged in the way in which they are subsequently to be printed.

Figures 3A, 3B:
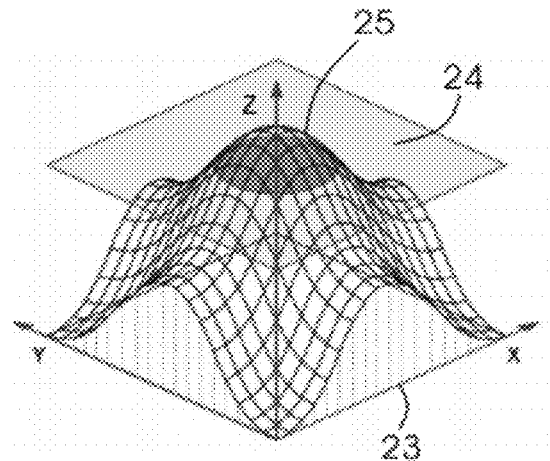
FIGS. 3A and 3B are simplified representations of the subarea of a threshold value matrix, which is used to explain a second exemplary embodiment of the method according to the invention.

The separate descriptions 3, present in the form of half-tone images, are then to be converted into screen data. To this end, firstly the screening method suitable for the present print job (e.g. amplitude modulation or frequency modulation, rational or irrational screen, etc.), the number of lines, etc., have to be selected. In accordance with this selection, a threshold value matrix 4 is generated which is used to transfer the tonal values in the half-tone images of the descriptions 3 into pixels to be exposed or not to be exposed in the screened dataset, by means of comparison with the entries for the pixels in the threshold value matrix. The values in the cells of the threshold value matrix 4 for amplitude-modulated screens form, for example, the shape of the outside of a bell, as illustrated in FIG. 3A. For frequency-modulated screens, the "mountain range" which represents the values in the matrix will of course appear differently.

By means of a comparison of the entries in the threshold value matrix 4 with the tonal values of the files 3 which describe the printed sheet, the raster processor (RIP) 5 produces a screened dataset 6 with a resolution of typically 2400 dpi or 2540 dpi. These datasets 6, likewise present for each color to be printed, are used to activate the plate exposer 7 with which the printing plates 8b, 8y, 8m, 8c for the printing with the four colors black, yellow, magenta and cyan are imaged directly.

Using the printing plates 8 produced in this way, the printed sheets 10 are then printed in a press 9, for example a sheetfed offset press. Alternatively, films can also be imaged, which are then copied across to the printing plates or, in a proofing device, a proof sheet is firstly produced in another printing process, for example by inkjet printing or laser printing.

The press 9 in the present case has what are known as anilox inking units, as described in European published patent application EP 1 834 775 A2, for example. As already explained at the beginning, by using these inking units the amount of ink with which the plates 8 are inked can be controlled only within narrow limits. If then, during printing, an excessively high full-tone density arises in one or more colors, the procedure is as follows for the affected colors within the context of a working preparation process in the print shop:

The printer assesses the printed sheet 10 as to whether and to what extent the disruptive effect can be reduced by reducing the surface density of the image information on the printing plate. This assessment step has been designated 11. Of course, this assessment does not have to be carried out for every printed sheet but can also be carried out only by using test pages. Instead of a visual assessment which is based on experience, it is of course also possible to evaluate the printed sheet with regard to the thickness of the ink layer printed, which means to measure it densitometrically or spectrally. This is primarily concerned with the determination of the full-tone density.

According to the prior art mentioned at the beginning, a micro screen could then be superimposed on the screened dataset and a second set of printing plates could then be exposed, with which the print job can then be carried out at the desired quality, which is symbolized by the corresponding arrow 20 in FIG. 1. According to the invention, an intervention in the prepress sequences is made at another point during production:

Example 1

According to the first exemplary embodiment of the invention (B1), at the point where the separate description of the printed sheet 3 is produced, a half-tone file is produced which has all the necessary information for the plate to be exposed of the relevant color separation, specifically in one plane, that is to say what is concerned here is no longer various graphic objects, as is usual in page description languages, which to some extent also describe the printed sheet in overlapping form, but a single dataset or a plurality of datasets which contain directly mutually adjoining pixels and, in their entirety, correspond to a half-tone image. In these datasets, the half-tone information is encoded in a specific gray depth of, for example, 8 bits or else a variable gray depth of, for example, 8 and 12 bits. They are created with the same resolution as that of the screened datasets 6 of, for example, 2400 dpi, which means that the amount of image pixels in this half-tone image newly to be produced corresponds to the amount of raster pixels in the screened dataset 6. As an option, for the resolution of a half-tone image, an integer subset of the raster image can also be selected. This can also be different in the two axes, independently of each other. Because of the very high amount of data in the datasets, these are either produced only temporarily in the RAM or stored as a file with suitable compression.

The exemplary embodiment will be explained in more detail by using FIG. 2. The visual representation of the dataset produced there, for example for the color magenta, is designated 13m. This gray image comprises individual pixels which, in the zoomed-out illustration on the right-hand side, are designated 114a and 114b, for example. The pixels of this data field 14 are in each case combined to form square areas, of which the areas 14a and 14b are illustrated as zoomed out by way of example. According to this exemplary embodiment of the invention, the square areas 14a, 14b, . . . , designated micro-areas below, of the entire dataset are assessed in relation to the average tonal value of each micro-area. Using this average value, a calculation is made as to how many pixels 114, for example in the micro-area 14, must be erased in order to reduce the tonal value of the micro-area overall to the extent that a reduction in the ink layer thickness to the desired extent is produced on the printed sheet. Instead of a calculation, a table can also be indicated, in which the corresponding information is stored. If, therefore, for example the ink layer thickness must be reduced by 10%, for the area 14b which is relatively light as compared with the tonal values of the overall image, this can mean that two pixels there, specifically the pixels 15n and 15m, in the micro-area 14b are "set to white". For the micro-area 14a, which is dark on average, on the other hand, it can mean that six pixels are set to white there, as illustrated in the example.

The decision as to which of the pixels within the micro-area are "set to white" can likewise also be stored in the table. For instance, this can always be the same positions in a specific order or the positions of the pixels to be "erased" can be based on the tonal value distribution within the micro-area. A random distribution of the "white dots" to be set is also possible. It may be advantageous, for example, to mix these criteria with one another, for example therefore preferably to distribute the white dots randomly about the centre of gravity of the tonal value distribution.

In this way, a perforated half-tone image is produced, in which then, after passing through a low-pass filter, the average tonal value of the image data would be reduced in the desired manner defined by the table. In actual fact, however, the explicit application of a low-pass filter is not necessary.

This is because the screening by the raster processor 5 already constitutes such a low-pass filter. If, therefore, the image perforated as described or the associated dataset is screened, then the pixels that have been erased or set to white of the half-tone image become visible in the corresponding screened dataset 6 with the probability which corresponds to the area coverage by the screening and thus reduce the resulting area coverage on the exposed plate when printing is carried out with the latter, and the ink picked up from the inking unit by the printing plate by the remaining "black" pixels is then discharged into the pixels set "to white" or the associated points on the sheet when printed onto the sheet. Of course, it is also possible to calculate the relationship between the desired reduction in the area coverage and the number of white dots to be set. In formulaic terms, this relationship can be represented approximately as follows:

The average tonal value of a micro-area $T_M$ is given by the following formula:

$$T_M = \frac{1}{N_G} \sum_{n=1}^{N_G} T_n \times G_n$$

where $N_G$ is the total number of all the pixels of the micro-area, $T_N$ is the individual tonal value of each pixel in the micro-area, which is to be added up, and $G_N$ is an individual weighting factor for each tonal value, via which for example a calibration can be incorporated in the calculation of the result.

The number of pixels $N_L$ to be erased is given by the number $N_M$ of pixels of a micro-area which are needed at the maximum tonal value $T_{max}$ in order to achieve on average the current average tonal value $T_M$ in the micro-area:

$$N_L = (N_M - N_S - X) \times A$$

Here, $N_S$ is a number of pixels which likewise are not to be modified (in order to safeguard the "color potential" when the pixels set to white enter the print), X is an auxiliary variable and A is an adaptation factor with:

$$N_M = N_G \times \frac{T_M}{T_{max}}.$$

The auxiliary variable X is in turn given by $$X = (T_M - T_S) \times \frac{T_{max} - T_S}{R \times N_G - N_S},$$

where, as already stated, $T_{max}$ is the maximum tonal value, $T_S$ is the tonal value resulting from the number of cells $N_S$ not to be modified, and R represents the desired reduction for the full-tone in percent.

The adaptation factor A can take account of the fact that the extent of the correction and therefore the number of pixels to be erased in the micro-areas can also depend on the printing ink used and on the arrangement of the printing unit assigned to the respective color within the machine. For instance, the ink applied in the last printing unit is then no longer rolled over, since no further printing units follow, which in turn has an effect on the extent to which printing ink from the pixels set "to white" can be removed from the inked neighboring pixels.

The corresponding algorithms for producing the high-resolution half-tone image 13m and the setting of the white dots into the micro-areas 14 of this file can be provided by suitable software or, respectively, there is no difficulty in programming the corresponding sequences into software in order to use the known and present datasets from the prepress stage to derive the datasets having the properties described above.

The computing rule for the setting of the white dots can be provided by applying convolution filter mechanisms. A convolution filter is a low-pass filter, during the application of which the value of an image point is replaced by a modified value which is given by a weighted sum of the values of the neighboring image points, it being possible for the weighting factors for the various neighboring points to be different. To this extent, such a convolution filter corresponds to a division of the image into micro-areas, in that, by taking the neighboring image points into account, an area is defined from which the tonal values corresponding to the weighting factors are added up. In this case, the setting of the white dots in the gray image of the dataset 13m according to FIG. 2 proceeds as follows: The image is traveled over line by line or in another geometry, for example a meandering geometry, and image point by image point and the tonal values of the image point itself and of its neighboring image points, for example in a region comprising 5×5 or 8×8 image points, are added up in accordance with predefined weighting factors to form a weighted tonal value. During each step to the next image point, these weighted tonal values are once more added up. Every time a set threshold value is reached, which is a measure of the reduction in the surface density, it is arranged for the image point that has then been reached to be erased, which means set to white. In this way, the dataset is progressively covered with a network of white dots, these consequently being more dense the higher the tonal values at the relevant points in the image.

This method can be modified further in that, in addition and specifically when comparing the summed weighted tonal values with the threshold value, what are known as "error diffusion" mechanisms are incorporated. In simple terms, the procedure is such that the surplus difference between the summed weighted tonal values and the threshold value is stored and added to the tonal values to be added up for the setting of the next white dot.

Figure 2:
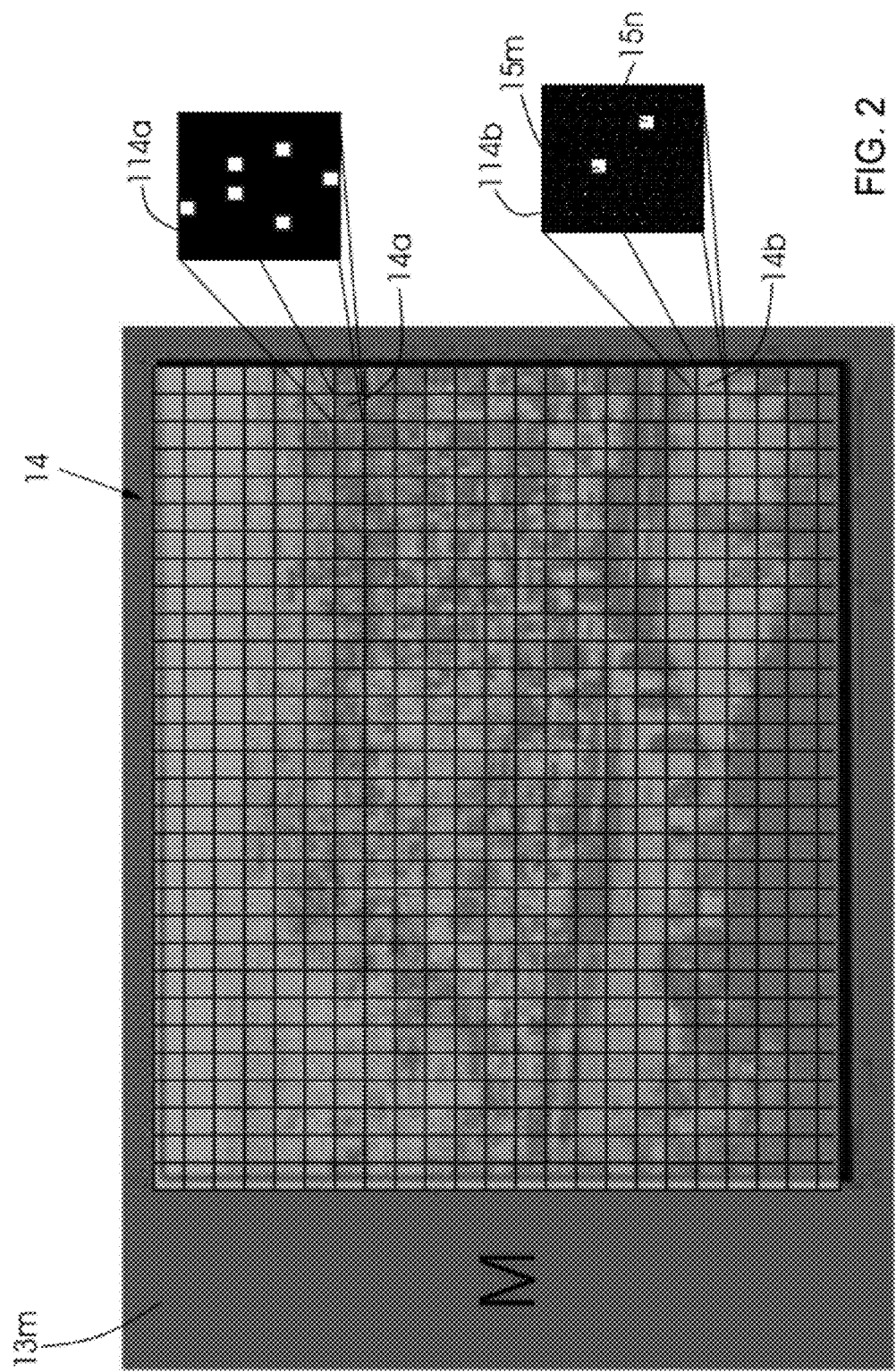
FIG. 2 is a simplified representation of the image data to be modified according to a first exemplary embodiment of the invention.

In this method variant, described above, the convolution filter thus takes on the task of the micro-areas in the exemplary embodiment according to FIG. 2, specifically of determining an average tonal value from neighboring pixels in the datasets of the finely resolved half-tone image.

Example 2

In this exemplary embodiment, each known and conventional description of the printed sheet on the basis of half-tone data, i.e. non-screened pages, can be used. Instead, action is taken in the threshold value matrices which are generated during the preparation of the screening of the image data.

As already mentioned above with the aid of FIG. 1, during the decision for a specific screening method, different threshold value matrices 4 are generated or retrieved, the threshold values of which can have the shape of a bell curve, for example, for the case of amplitude-modulated screens. Since in the case of multicolor printing the individual separations are screened at different angles, for every color to be printed there is also a set deviating therefrom of threshold value matrices having correspondingly different value entries. In FIG. 3A, the threshold value matrix 23 for one half-tone cell is illustrated by way of example. The surface 24 cutting the threshold value mountain range at a certain height Z symbolizes the tonal value in the half-tone image which, during the screening and by means of comparison with the entries in the threshold value matrix, ensures that the cut area with the threshold value mountain range, that is to say the pixels of the part 25 colored black, are later exposed by the plate exposer and thus yield the screen dot.

In FIG. 3B, such a threshold value matrix 23m, comprising 10 columns and 10 rows, is illustrated in simplified form, the entries being made in such a way that each tonal value is assigned exactly one comparative value. In this sense, this relatively simple matrix is therefore linear. In practice, the screen matrices have a very much larger number of elements and can also contain a plurality of equivalent entries for specific tonal values. A typical threshold value matrix as is used for an irrational amplitude screen can have approximately 100 000 elements, the tonal values preferably being resolved to a depth of 12 bits, so that entries between 0 and 4095 result for the matrix elements.

According to this second exemplary embodiment of the invention, in accordance with the desired reduction in the surface density in the threshold value matrices with which these separated half-tone datasets are to be screened, a corresponding amount of elements is set to a value which corresponds to the color white (arrow B2 in FIG. 1). In the exemplary embodiment described according to FIG. 3A, this would be the entry "0", that is to say, as illustrated in FIG. 3B, individual elements of the matrix—the number depends on the extent of the desired reduction in the surface density—are set to the value 0.

For instance, in the case of a desired 20% reduction with elements of the matrix sorted in rising order, this can be every fifth matrix element. However, it is also possible to depart from this rule in that, in addition, account is taken of the fact that no matrix elements to be set to the value for white adjoin one another directly in the matrix. Furthermore, it is possible to take into account that the entries to be set to white are preferably set in the edge regions of the matrix, where the entries belonging to high tonal values are present.

The advantage of this method is to be seen in the fact that, as compared with a half-tone image, very many fewer data points have to be changed in the threshold value matrices. It is also possible to create sets of threshold value matrices for specific reductions in the surface density as a one-time procedure, so that the corresponding matrix or the corresponding set then only needs to be retrieved, which means that the matrices do not have to be re-modified every time.

Figure 5A:
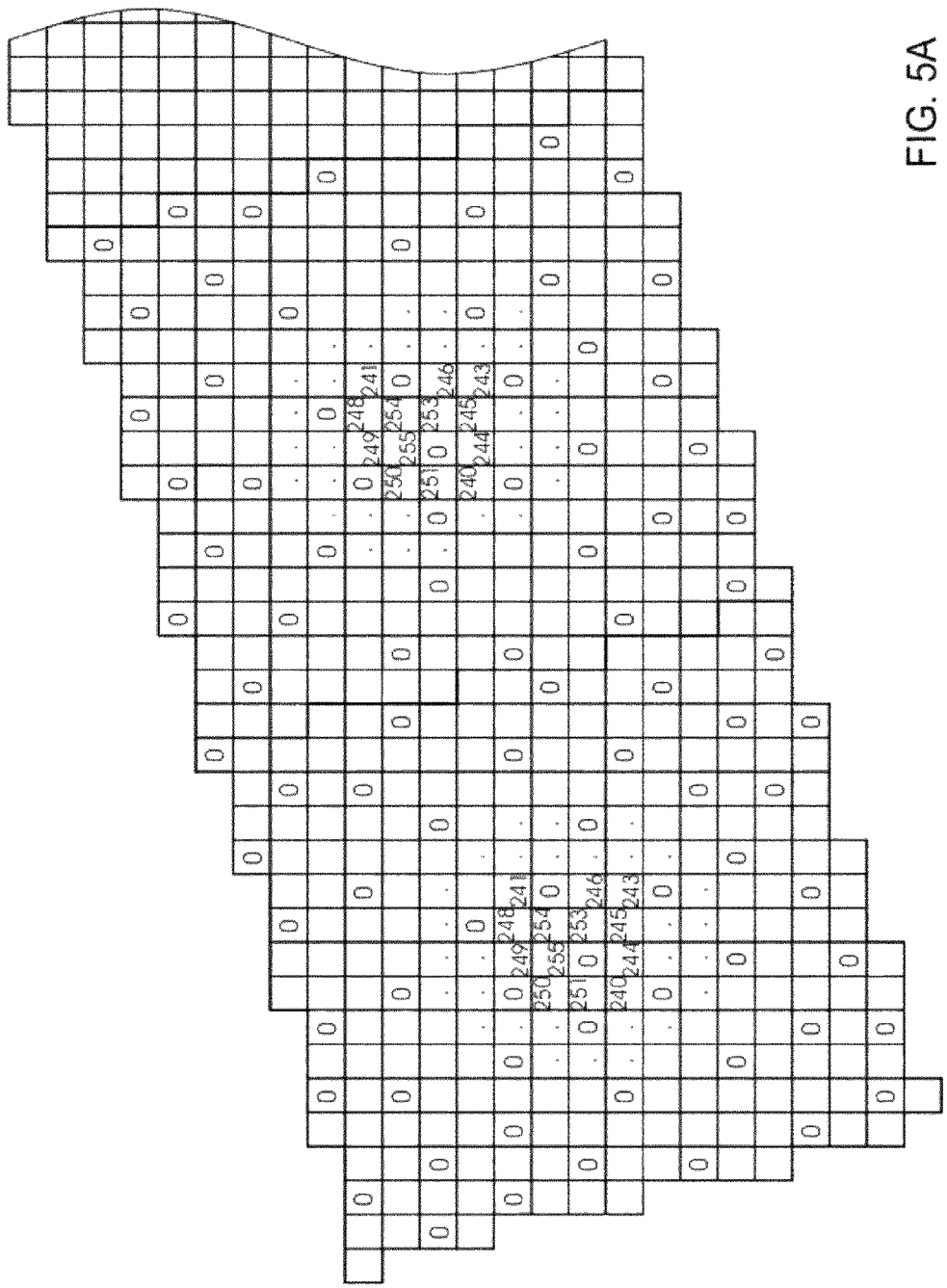
FIGS. 5A and 5B show threshold value matrices which are modified in accordance with a second exemplary embodiment of the invention.

FIG. 5A shows, by way of example, how the printed dots can appear in an image screened with amplitude modulation with a tonal value resolution of 8 bits, using the threshold value matrices as described above. As a result of the values of the matrices set to the value 0 for white, "holes" are produced on the exposed printing plate in the printing dots which, during the subsequent printing of the paper sheet, are filled with ink from the neighboring pixels and thus overall reduce the ink layer thickness of the printed dot.

In this example, it was assumed that the entries in the matrix to be set to white are made substantially equally distributed over the area of the matrix, which corresponds to a linear reduction in the area coverage by a constant percentage over the entire tonal value range. In the illustration according to FIG. 4, where the area coverage is plotted against the tonal value, this would correspond to the straight line designated "1".

Figure 4:
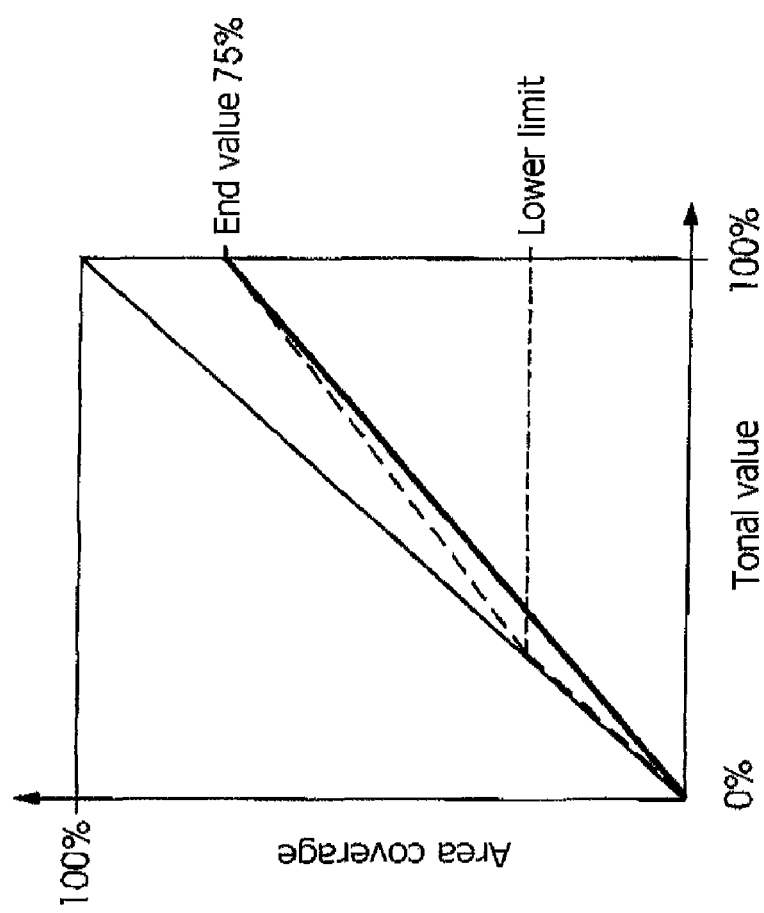
FIG. 4 is a graph in which the relationship between the tonal values of an image to be screened and the area coverage during printing is illustrated.
Figure 6A:
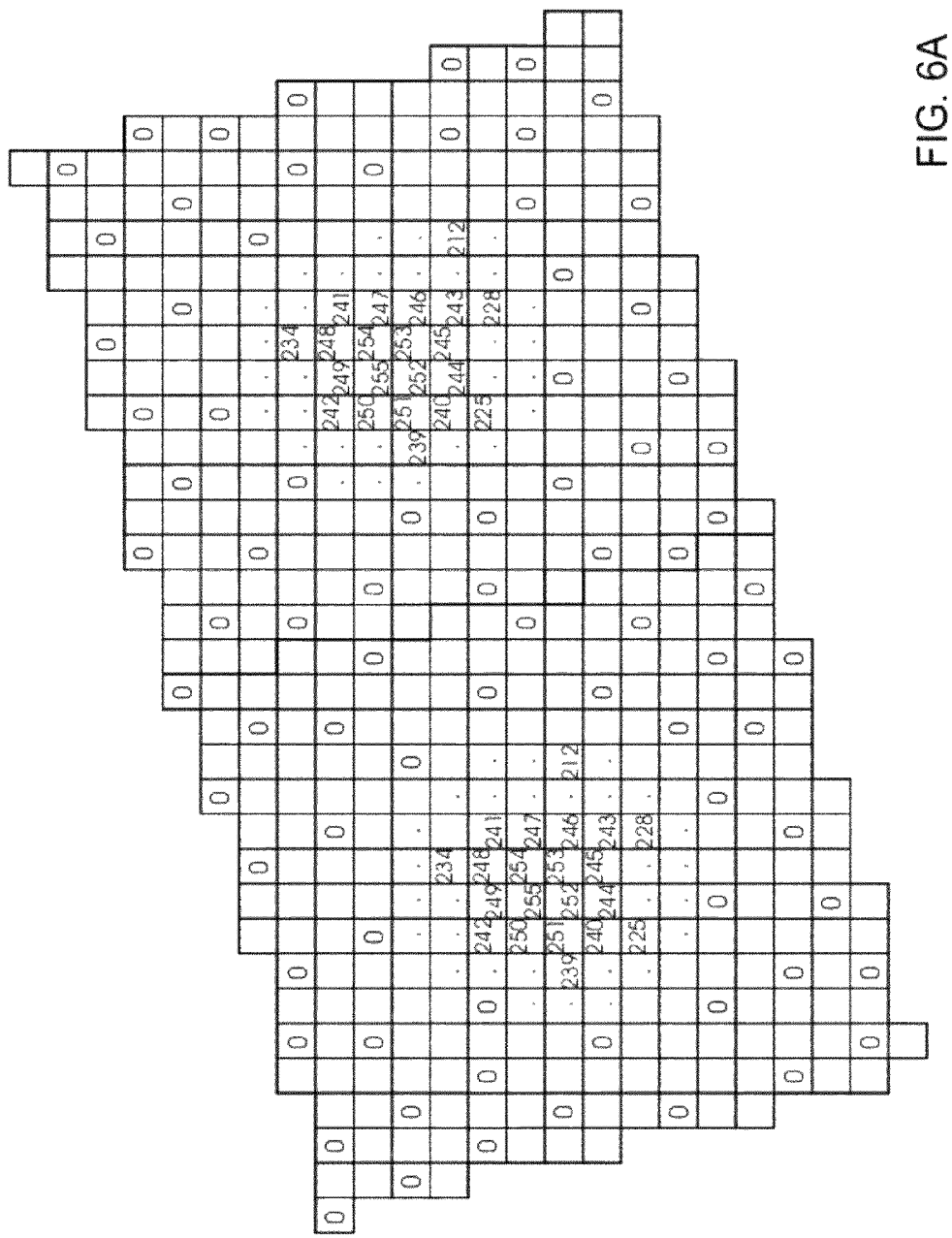
FIGS. 6A and 6B show threshold value matrices which are modified in accordance with an exemplary embodiment of the invention changed slightly as compared with FIG. 4.

However, it may also be expedient not to carry out the reduction in the area coverage linearly, for example to have the reduction start only at a lower limit of area coverage of 30%, as depicted by the dash-dotted curve n in FIG. 4. In this case, the modified threshold value matrices would appear different. As illustrated in FIG. 6A, it is then necessary to ensure by means of a suitable algorithm that the centers of the raster dots are not perforated with white dots but that the white dots are written in the threshold value matrix only beginning at a specific magnitude of the values, it also being possible for the algorithm to be selected such that the result is an accumulation of white dots at the edges of the half-tone cell.

Figure 5B:
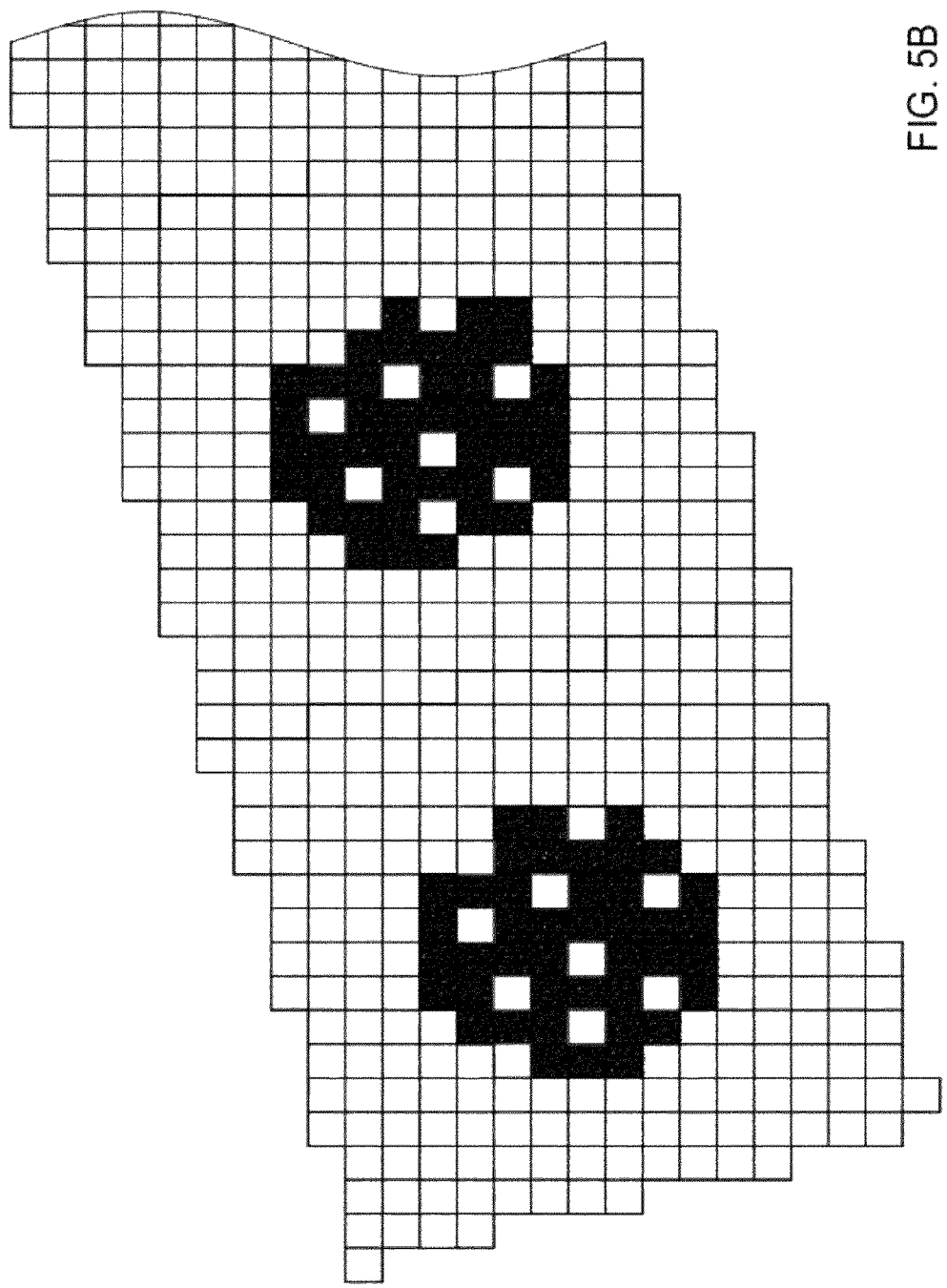
Figure 6B:
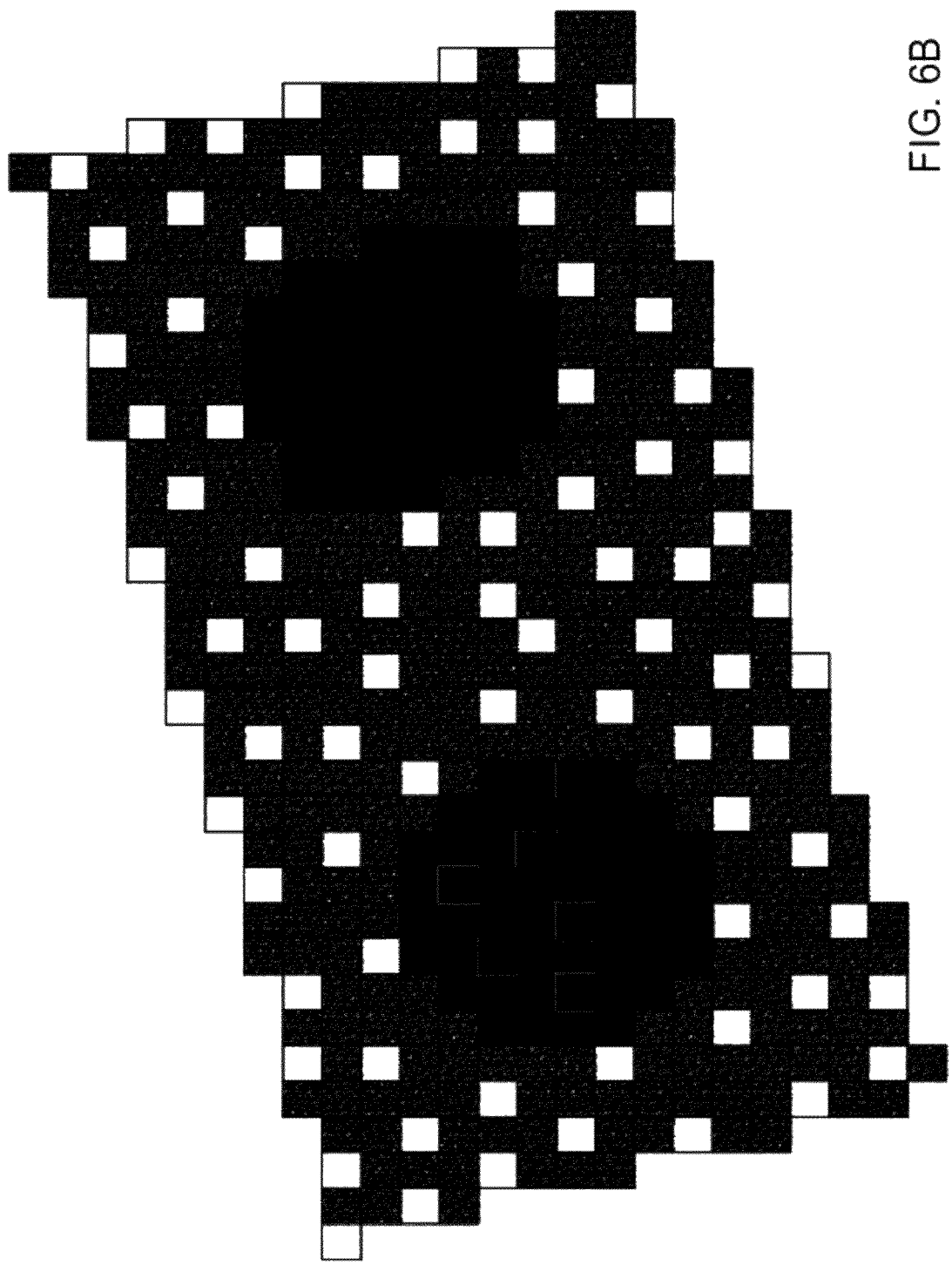
Figures 7A, 7B:
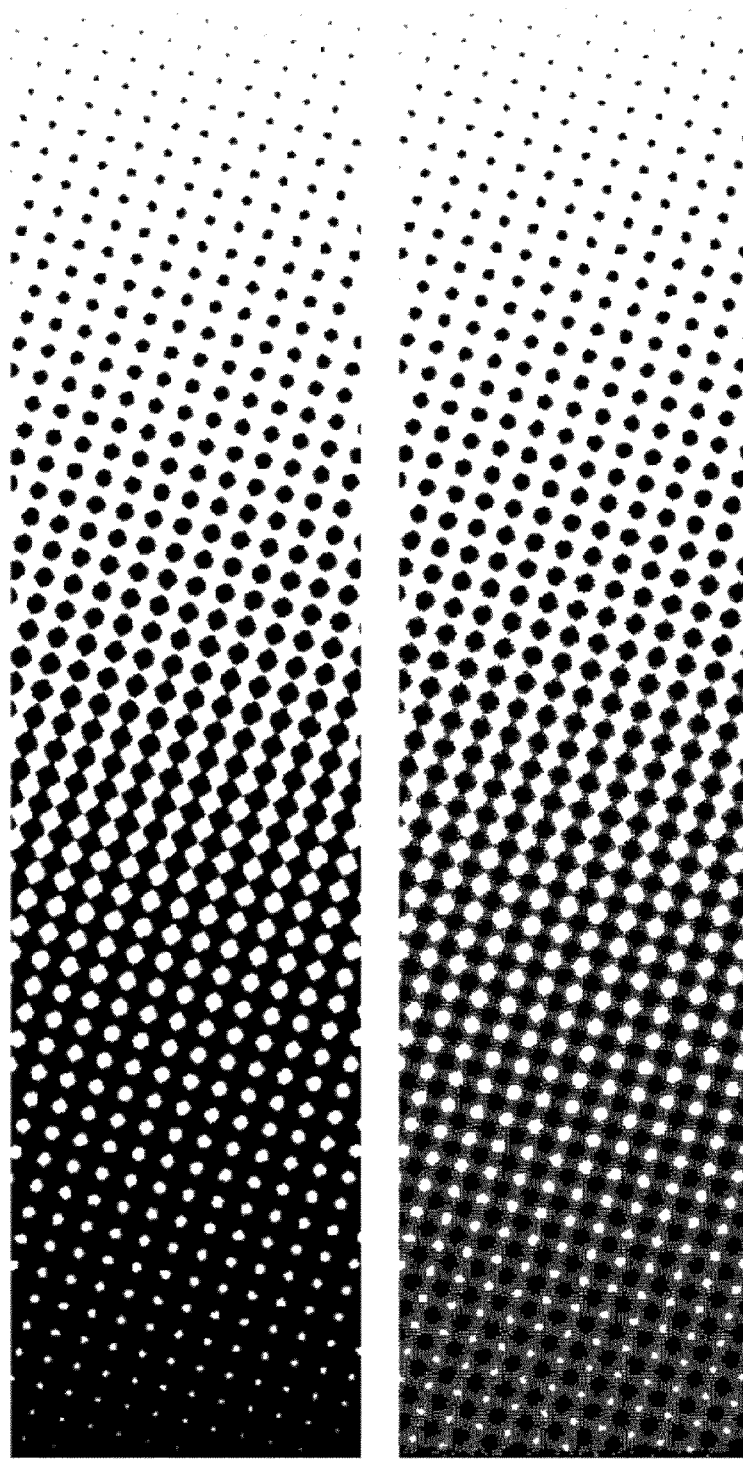
FIGS. 7A and 7B show the course of amplitude screens from the smallest (0) area coverage up to the largest area coverage (100%) in conventional screening (FIG. 7A) and, respectively, area coverage reduced in accordance with a method according to the invention (FIG. 7B)

In FIG. 6B, the result of the area coverage in two half-tone cells is illustrated for the course in accordance with the graphic illustrated in FIG. 5. Given a tonal value of 100%, the result would be the perforation of the cell with white dots illustrated there, the centers and therefore the printed dots remaining contiguous in the exposers, i.e. at low tonal values up to about 30% area coverage in the example shown. These are the regions reproduced in deep black in the figure, while the regions in the full-tone, hatched gray for better clarity, of course likewise appear black. The effect of such a modification may be seen well by using FIGS. 7A and 7B. In FIG. 7A, a gray wedge amplitude-screened in the conventional way is illustrated but without any reduction in the area coverage. The result is the usual increase in the area coverage as a result of enlargement of the raster dots until they touch one another and, at 100% full-tone, completely cover the area to be printed.

In the case of reduced-area screening according to the second exemplary embodiment of the invention, in the variant described by using FIGS. 6A/B, a reduced full-tone value results from the fact that the outer regions of the screen dots are perforated but the centers are not. A reduced-area half-tone amplitude is thus obtained, the shape of the screen dots remaining relatively symmetrical.

Example 3

Figure 9:
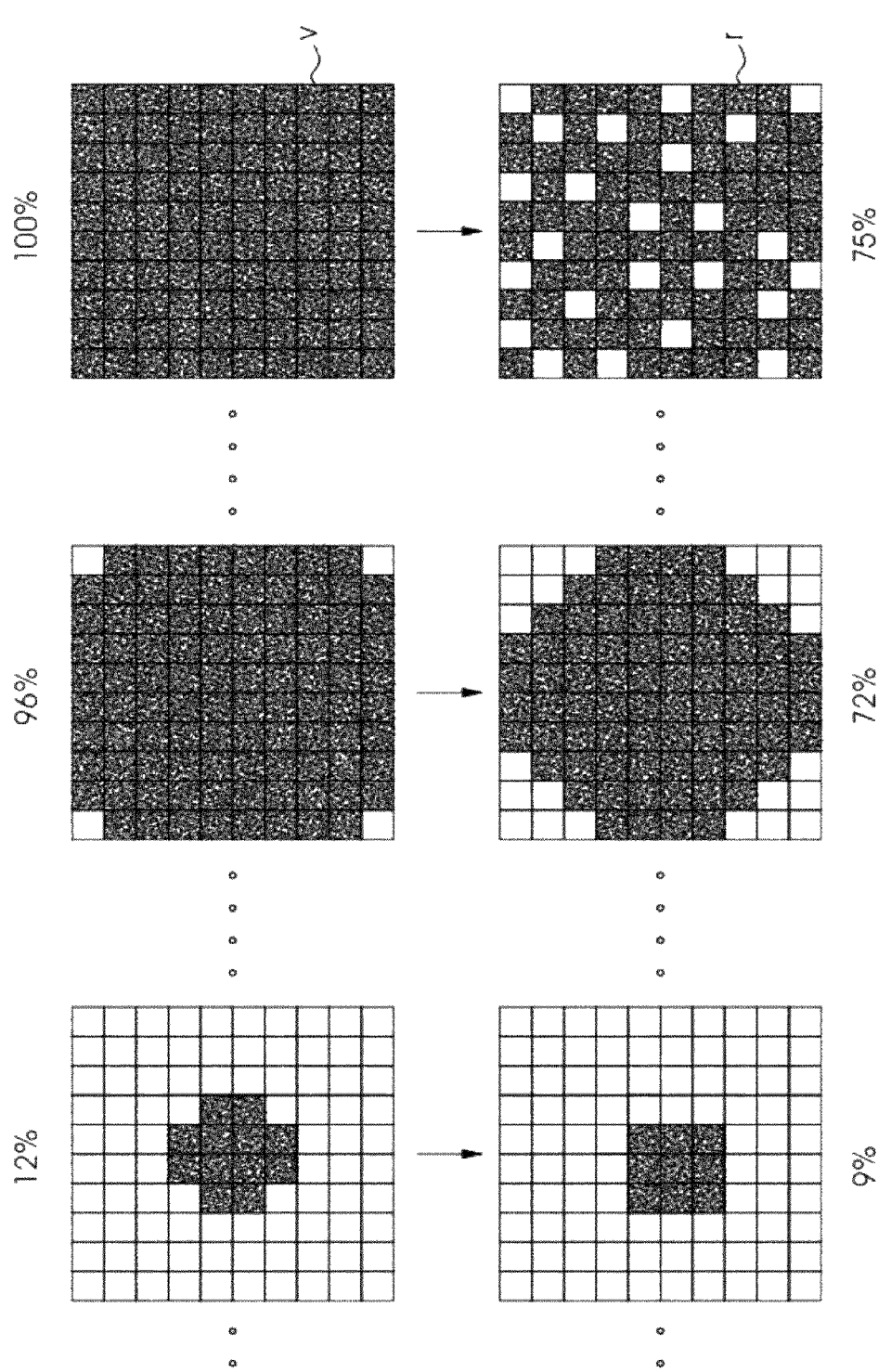
FIG. 9 is a simplified representation of individual half-tone cells in the case of different tonal values in "normal" screening (upper row) and screening with reduced area coverage according to a third exemplary embodiment of the invention.

According to a third exemplary embodiment of the invention (arrow B3 in FIG. 1), for the separate descriptions of the printed sheet it is defined how the full-tone components of the printed image are to be handled, i.e. the image pixels whose tonal values lie at 100% or above a tonal value coming rather close to the full-tone, such as 98% or 99%. For the image components having these full-tone values, a frequency-modulated screening method is selected which, with regard to the number of pixels remaining white in the half-tone cells of the screened dataset, is set up in such a way that the desired reduced area coverage is achieved instead of the full-tone for the tonal values of, for example, >99%. If, for example, the inking in the full-tone is to be reduced by 25%, the corresponding image components are screened with a frequency-modulated screen which, in the print, effectively results in an area coverage of only 75%. This is illustrated in the right-hand column in FIG. 9 by way of example and in simplified form. There, v designates a half-tone cell having 10×10 pixels, whose individual pixels would all have had to be set for the full-tone case (100% area coverage). Instead, the screening with the frequency-modulated screen leads to the half-tone cell designated r being provided with a pattern of white dots and the full-tone regions being correspondingly "perforated," which leads to the desired reduction in the tonal value to, for example, 75%. Expediently, in order to avoid visible structures, a random distribution of the non-printing pixels is desired and therefore a stochastic screening method is selected for the full-tones.

On the other hand, all the half-tones in the image in the region between the tonal value 0% and the tonal value of 99%, for example, are screened as originally planned for the print job by using an amplitude-modulated screen. In this case, however, care must be taken that no tonal value jumps occur and that the area coverage values increase continuously, starting from 0, up to the value of 75% here for the reduced area coverage of the full-tones. In a corresponding way, the respective threshold value matrices have to be recalibrated to the reduced value and possibly re-linearized. This is illustrated by way of example in the left-hand and central columns of FIG. 9. There, the area coverage values of 12% and 96% have been reduced to 9% and 72% respectively in accordance with the recalibration, which manifests itself in correspondingly smaller screen dots in the cells of the amplitude screen.

Figure 8:
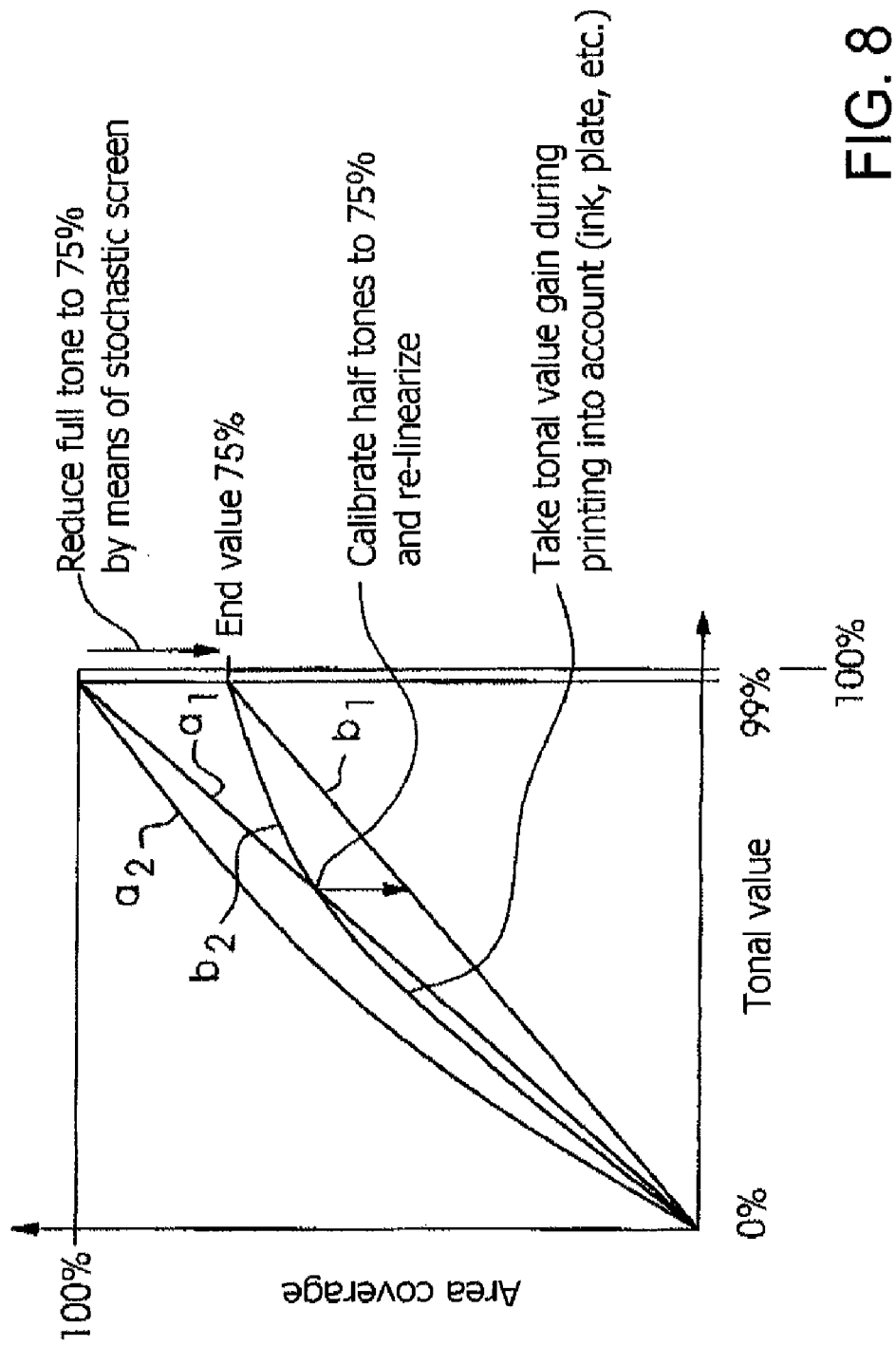
FIG. 8 is a graph in which the relationship between the tonal values of an image to be screened and the area coverage during printing is illustrated.

This fact is illustrated in the representation according to FIG. 8. In the graph shown there, the area coverage is plotted against the tonal value, the ideal course being represented by the straight line designated $a_1$, and the curve designated $a_2$ describing the relationship between tonal value and area coverage while taking into account the tonal value gain during printing.

The screening of the areas having 100% tonal value leads to a discontinuity in the full-tones. In order to counter this, the area coverage range is then recalibrated to 75% by the threshold value matrices for the amplitude-modulated screen, for example, being modified for the half-tones in the range 0 to 99%. This leads to tilting of the straight line $a_1$ into the position designated $b_1$. Furthermore, the relationship between tonal value and area coverage then has to be re-linearized in accordance with the tonal value gain, which then results in the curve designated $b_2$.

The extent of the linearization depends on various parameters, such as the ink to be printed, its temperature, on the type of printing plate used, on its moisture and possibly also on the type of blanket used. Here, as has also already been customary hitherto, empirically determined curves which have been recorded and stored in accordance with the parameters mentioned above can be used. The same is also true of the operating media used: the tools currently on the market for the processing of prepress data permit the calibration and linearization of tonal values relating to the area coverage in accordance with a standard and are integrated into the software packages as corresponding functions. In the software package "Prinect" from Heidelberger Druckmaschinen AG, these are for example the tools "Calibration Manager" and the linearization function in the software module "MetaDimension." There, various different screening methods are also offered for selection. In order to carry out the method, however, it is necessary to define that the area coverage assigned to the full-tone values is "screened down" to the desired value with the stochastic pattern, and the remaining image constituents are screened "normally" with, for example, an amplitude-modulated screen after the associated threshold value matrices have been recalibrated.

The following list of reference numerals and symbols may aid the reader in the reading of the foregoing specification:

| | |
|---|---|
| 1 | Page |
| 2 | Impositioning |
| 3 | Separate description of the printed sheet |
| 4 | Threshold value matrix |
| 5 | Screening process |
| 6 | Screened dataset |
| 7 | Plate exposer |
| 8b | "Black" printing plate |
| 8y | "Yellow" printing plate |
| 8m | "Magenta" printing plate |
| 8c | "Cyan" printing plate |
| 9 | Sheetfed offset press |
| 10 | Printed sheet |
| 11 | Assessment of the sheet |
| 13m | "Magenta" half-tone image dataset |
| 14 | Data field |
| 14a,b | Micro-area |
| 15n,m | Pixels set "to white" |
| 20 | Arrow |
| 23 | Threshold value matrix |
| 24 | Surface intersecting threshold value mountain range |
| 25 | Cut part (threshold value mountain range) |
| 114a,b | Pixels |
| Z | Height |
| a1 | Straight line |
| a2 | Curve |
| b1 | Position (a1) |
| b2 | Curve |
| v | Full-tone half-tone cell |
| r | Half-tone cell |
| $B_2$ | Arrow |

The invention claimed is:

1. A method of producing printing plates with reduced area coverage, which comprises:
   prior to screening image data for a subsequent exposure of printing forms, providing one or more data files with data needed for the screening step and changing the data such that values of individual elements in two-dimensional data fields are changed, and thereby determining a number of elements whose values are changed by evaluating regions within the data fields;

producing image datasets subdivided into micro-areas;

determining an average tonal value within the micro-areas and determining from the average, in accordance with a relationship in the micro-area based on the desired tonal value reduction, a number of pixels to be subsequently erased and set to a value zero, corresponding to an uncovered area in the printed image;

fixing the positions of pixels to be erased at fixedly predefined points within the micro-areas; and defining the positions of pixels to be erased as points at which, during a subsequent screening process, the pixels fall between centers of the screen dots.

2. A method of producing printing plates with reduced area coverage, which comprises:

prior to screening image data for a subsequent exposure of printing forms, providing one or more data files with data needed for the screening step and changing the data such that values of individual elements in two-dimensional data fields are changed, and thereby determining a number of elements whose values are changed by evaluating regions within the data fields;

producing image datasets subdivided into micro-areas;

changing values of individual elements in the two-dimensional data fields by using an error diffusion algorithm such that individual elements are then changed or a value thereof is optionally erased or set to a value corresponding to a color white when accumulated tonal values exceed a predefined threshold value; and also taking into account a remaining difference between the accumulated tonal value and the threshold value during a determination of the next value to be changed.

3. A method of producing printing plates with reduced area coverage, which comprises:

prior to screening image data for a subsequent exposure of printing forms, providing one or more data files with data needed for the screening step and changing the data such that values of individual elements in two-dimensional data fields are changed, and thereby determining a number of elements whose values are changed by evaluating regions within the data fields;

providing the file having the data to be changed as a threshold value matrix used for a subsequent screening process;

screening only substantially full-tone image points with a frequency-modulated screen, so that an amount of pixels remaining white in half-tone cells leads to a desired reduction in a full-tone density; and defining half-tone image points as having tonal values below those of the full-tones, calibrating the threshold value matrix for screening the half-tone image points to the value to which the full-tone density is reduced.

4. The method according to claim 3, wherein the frequency-modulated screen is a stochastic screen.

5. The method according to claim 3, which comprises using different screens for screening the full-tones and for screening the half-tones.

6. The method according to claim 3, which comprises screening the half-tones with an amplitude-modulated screen.

7. The method according to claim 3, which comprises calibrating the threshold value matrix for the screening of the half-tones linearly.

8. The method according to claim 3, which comprises calibrating the half-tones in accordance with predefined functions depending on one or more printing parameters selected from the group consisting on an ink to be printed, a printing plate used, a blanket used, and an amount of dampening solution supplied during printing.

9. A method of producing printing plates with reduced area coverage, which comprises:

prior to screening image data for a subsequent exposure of printing forms, changing the data in one or more files needed for the screening step such that only substantially full-tone image points are screened with a frequency-modulated screen, an amount of pixels remaining white in half-tone cells leading to a desired reduction in the full-tone density; and defining half-tone image points as having tonal values below those of the full-tones, calibrating a threshold value matrix for screening the half-tone image points to the value to which the full-tone density is reduced.

* * * * *